United States Patent [19]

Elsner

[11] 4,205,803
[45] Jun. 3, 1980

[54] ADAPTOR FOR A FILM VIEWER

[75] Inventor: Ernst K. Elsner, Bangkok, Thailand

[73] Assignee: Qualidux Industrial Company Limited, Aberdeen, Hong Kong

[21] Appl. No.: 879,242

[22] Filed: Feb. 21, 1978

[30] Foreign Application Priority Data

Dec. 5, 1977 [GB] United Kingdom ............... 50588/77

[51] Int. Cl.² .......................... G03B 23/04; G03B 1/20
[52] U.S. Cl. ................................. 242/55.21; 242/199;
242/205; 352/128; 352/129; 353/DIG. 2
[58] Field of Search .................. 242/55.21, 197, 55.17,
242/199, 200, 194, 55.19 A, 205; 352/126, 128,
129, 72, 78; 353/26 R, 43, DIG. 2; 40/362, 364

[56] References Cited

U.S. PATENT DOCUMENTS

| 1,104,616 | 7/1914 | Brenner | 242/55.21 |
| 1,479,331 | 1/1924 | Stephenson | 242/55.21 |
| 2,085,439 | 6/1937 | Morlock | 242/55.21 |
| 3,292,875 | 12/1966 | Rojic | 242/55.21 |
| 3,388,873 | 6/1968 | Rosenbaum | 242/55.21 |
| 3,606,185 | 9/1971 | Martin | 242/55.21 |

Primary Examiner—George F. Mautz
Attorney, Agent, or Firm—Wood, Herron & Evans

[57] ABSTRACT

A moving film projector, viewer or an adaptor device therefor comprising a rotatable spindle to receive a let-off spool or reel of film, a rotatable take-up spool or reel and a guide to direct the film in its desired path from the let-off spool, when this is in position on the spindle therefor, past a viewing station at which the film can be viewed or projected, and over the edge of and down towards the center plane of, the take-up spool, the take-up spool having a substantially continuous peripheral side wall towards which the film strip is guided and against which the film is coiled during use.

8 Claims, 3 Drawing Figures

ADAPTOR FOR A FILM VIEWER

This invention relates to viewers or projectors for cinematographic films and to devices for use therewith.

In order to move a strip of film carrying a series of frames of "moving" pictures past an aperture through which the film can be viewed, or through which light may be directed to project the picture in the frame opposite the aperture, onto a screen or the like, it has hitherto been the practice to drive the let-off spool from which the film is unwound and/or the take-up spool onto which the film is wound.

If the take-up spool is driven, a problem occurs in that if the speed of rotation of the spool is constant, the take-up speed of the film increases as the diameter of the roll of film wound on the spool, increases. Conversely, if the speed of the film is to remain constant, as it must in order to achieve correct timing of the movement of the picture frames past the aperture, then the speed of rotation of the take-up spool must constantly decrease during use.

Furthermore the leading end of the film strip has to be securely engaged in the spindle of the driven take-up spool which can be a somewhat cumbersome task.

These problems are to a large extent overcome by a "moving" film projector, viewer or an adaptor device therefor, in accordance with this invention comprising a rotatable spindle to receive a "let-off" spool or reel of film, a rotatable "take-up" spool or reel, a guide to direct the film in its desired path from the let-off spool when this is in position on the spindle therefor, past a viewing station at which the film can be viewed or projected and over the edge of and down towards the centre plane of, the take-up spool, the take-up spool having a substantially continuous peripheral side wall towards which the film strip is guided and against which the film is coiled during use.

Thus during use the film strip is fed from the let-off spool or reel through the guide for viewing or protection and then it emerges from the guide to a position ready to engage the upstanding side wall of the take-up spool at an acute angle thereto. The strip then passes smoothly around the wall until the length of film in the engagement with the wall is sufficient for the frictional forces between the film and wall to turn the take-up reel or spool. Once the take-up spool is rotating further lengths of film strip are spirally wound inside the coils of film already present in the spool and it will be appreciated that since the take-up spool is being driven by the film it will rotate, at all times, at a speed which is correct to take up the film emerging from the guide. Thus as the diameter of the coil of film in the take-up spool diminishes during winding, the rotational speed of the spool will increase.

Furthermore the leading end of the film does not have to be physically attached to the take-up spool.

The base of the take-up spool including the upstanding peripheral wall is preferably rotatably mounted on a mounting plate and is provided with a removal cover containing a portion of the guide for the film, and having an aperture to allow film to enter the spool when the cover is in position thereon.

The film strip may be driven in any convenient way. For example if the film strip is provided with a series of small apertures along one edge these apertures may be engaged, in turn, by a needle driven by a motor. The needle may be arranged to move transversely of the film strip to engage in a hole formed in the edge thereof, move in the longitudinal direction of the film for a distance equal to one frame and then retract and move back until it is positioned opposite the next aperture in the film. This drive is preferably the only one provided.

As explained above, the invention can be used in a film projector it is particularly useful for use with a hand-held viewer, for example that described in the specification of co-pending U.S. patent application Ser. No. 846,456, filed Oct. 28, 1977

When such a reciprocating drive is used the film is moved forward in a series of short steps or jerks causing the film to jerk and these jerks are transmitted to the let-off spool which, if free to rotate, is also driven in a series of jerks. Each jerk may in fact cause the spool to rotate to deliver more film than is required and the whole drive becomes erratic, loops of film being produced which may jam and stop operation of the device.

This problem is solved in accordance with a further feature of this invention wherein the film guide is so arranged as to guide the film strip away from the direct line between the position in which it emerges from the let-off spool, when this is in position on its spindle, and its desired position prior to engagement by the drive motor or its passage past the viewing/projecting station. The path in fact is made such that there is a predetermined length of film between the end of the film guide and the position at which the film emerges from the let-off spool. The length, which may be determined by trial and error, is sufficient to allow the film to move up and down so as to form successive small loops which are subsequently taken up or smoothed out by the reciprocating film drive. Thus fluctuations in the film caused by the reciprocating drive are smoothed out by the fluctuating loop of film strip and a substantially constant speed of rotation of the letoff spool or reel can be achieved.

This desirable effect may be enhanced by the provision of a pin or the like around which the film strip passes in its passage between the let-off spool and the beginning of the main film guide. The pin may be offset from the film path so as to cause the pin to be so positioned that the said pre-determined length of the film extends between the pin and the let-off spool.

If a device in accordance with this invention is to be used with a hand-held viewer such as that described in the specification of co-pending U.S. patent application Ser. No. 846,456, filed Oct. 28, 1977, it will be in the form of an adaptor, which can be connected to the viewer thus enabling the viewer to be used not only with the endless film cassette described in the said specification but also with standard 15 meter ("Super 8") film. In this case the film guide, the spindle, for the let-off spool and the take-up spool are all mounted on a base plate which is so dimensioned and arranged as to fit within the aperture in the viewer designed to receive an endless film cassette. The guide may then also have an aperture not only to permit the film to be viewed through the eye piece of the viewer but also to allow the needle of the reciprocating drive motor to engage the apertures in the edge of the film.

The invention will now be further described by way of example with reference to the accompanying drawings, in which.

Figure 1:
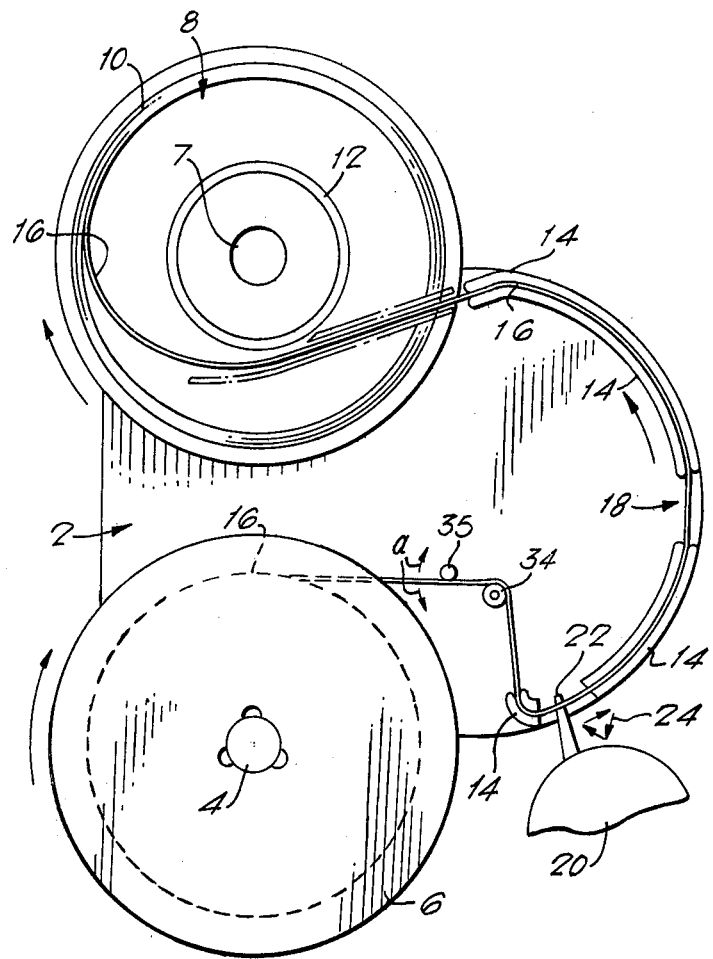
FIG. 1 is a diagrammmatic plan view of an adaptor device in accordance with this invention for use with a cinematographic film viewer.

Referring to FIG. 1 of the drawings, the adaptor comprises a base or mounting plate generally indicated at 2, having a freely rotatable spindle 4 onto which a standard let-off spool or reel 6, carrying for example standard 15 meter film, may be mounted. The base plate 2 has a freely rotatable spindle 7 carrying a take-up spool 8 formed with an upstanding peripheral wall 10 and a central core 12.

The plate also carries an upstanding film guide 14 in which film, indicated at 16, is guided after leaving the let-off spool 6 and before being wound onto the take-up spool 8. The guide carries the film past a viewing station defined by an aperture 18 through which light passes to enable the frame of the film 16 positioned opposite the aperture, to be viewed by a person looking at the film through the aperture as is described hereafter with reference to FIG. 3.

A drive motor 20 mounted within the viewer is provided with a needle member 22 positioned to engage one of a series of apertures in the edge portion of the film strip 16. The needle is driven to move, as indicated by the arrows 24, forwardly to engage in an aperture as shown in FIG. 1, and then transversely in the direction of the film strip to move the film strip forward across the aperture by a distance equal to one frame, and then back again out from engagement with the film strip to a position opposite to the next successive aperture ready for its next drive stroke. Thus the film strip is moved successively frame by frame across the aperture by the motor 20 which acts also to pull the film from the let-off spool 6 and to feed it through the guide 14 towards the take-up spool 8.

Figure 2:
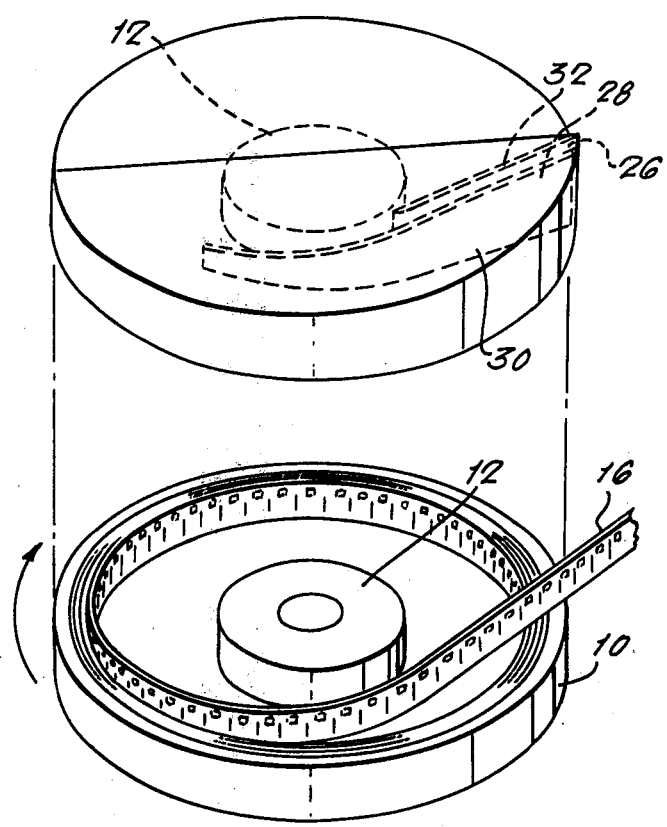
FIG. 2 is an exploded view of the take-up spool of the adaptor shown in FIG. 1.

The take-up spool 8 is provided with a cover, as can clearly be seen in FIG. 2, which is provided with an aperture 26 through which the film strip passes on emerging from the guide 14 and is itself formed with a guide 28 which extends over the peripheral wall 10 of the spool and then down within the spool to a position in the central plane of the spool. The outer wall 30 of the guide extends around the core and is bent so as to guide a film strip in contact therewith, into a position at which it engages the wall of the spool (or the inner coil of a coil of film being wound in the spool) approximately tangentially. The inner wall 32 of the guide 28 terminates adjacent the central core 12 of the spool.

If the film strip 16 is fed from the guide 14 through the aperture 26 into engagement with guide 28 and the motor is then operated, the film strip is fed in a series of successive steps forwardly through the guides 14 and 28 to a position at which the leading end engages the inner surface of the peripheral wall 10 of the take-up spool. The film strip then passes around the inner wall to a position in which the length of the film strip engaging the wall creates a sufficient frictional force so that further movement of the film strip 16 into the spool, causes the spool to rotate an its axis and the film strip to be wound up within the spool, from the outside wall towards the inner core.

It will be appreciated that with such a construction the leading edge of the film strip need not be in any way connected to the core. Further, as the inner diameter of the coil being wound in the take-up spool diminishes during winding, the speed of rotation of the take-up spool will increase automatically due to the fact that the take-up spool is driven by the film strip itself. Hence the spool always rotates at the correct speed to take up the length of film moved forward for each step of the drive motor 20.

As the drive motor 20 moves the film in a series of successive steps the film is in effect jerked which could cause a jerky rotation of the let-off spool 6 causing problems with film entanglement and an interrupted feed of the film past the viewing aperture. In order to avoid or diminish this jerky movement of the let-off spool it has been found desirable to feed the film strip 16 between the let-off spool 6 and the inlet to the film guide 14 around a guide pin 34 and beneath a pin 35 which upstand from the base plate 2. The pins are positioned at a sufficient distance from the let-off spool spindle to allow the length of film between the let-off spool and the pin to move up and down as illustrated by the arrows 'a' so that in effect a series of successive small loose loops are formed, the loops then being taken up by the jerky feed of the film strip permitting the let-off spool 6 to rotate substantially smoothly.

The correct position for the pins 34, 35 is determined by trial and error but it will be noticed that the pin is positioned to one side of the direct line between the let-off spool and the entrance to the film guide 14 so that the film is, in effect, bent around the pin 34, the pin 35 acting to restrain the movement. This somewhat tortuous path has been found to assist in obtaining the smooth rotation of the let-off spool.

The film may be wound back onto the let-off spool 6 on rotation thereof for example by a handle connected to the spindle 4 and positioned on the underside of the mounting plate. The film will travel back to the spool 6 either around the guide or pass directly from one spool to the other.

Figure 3:
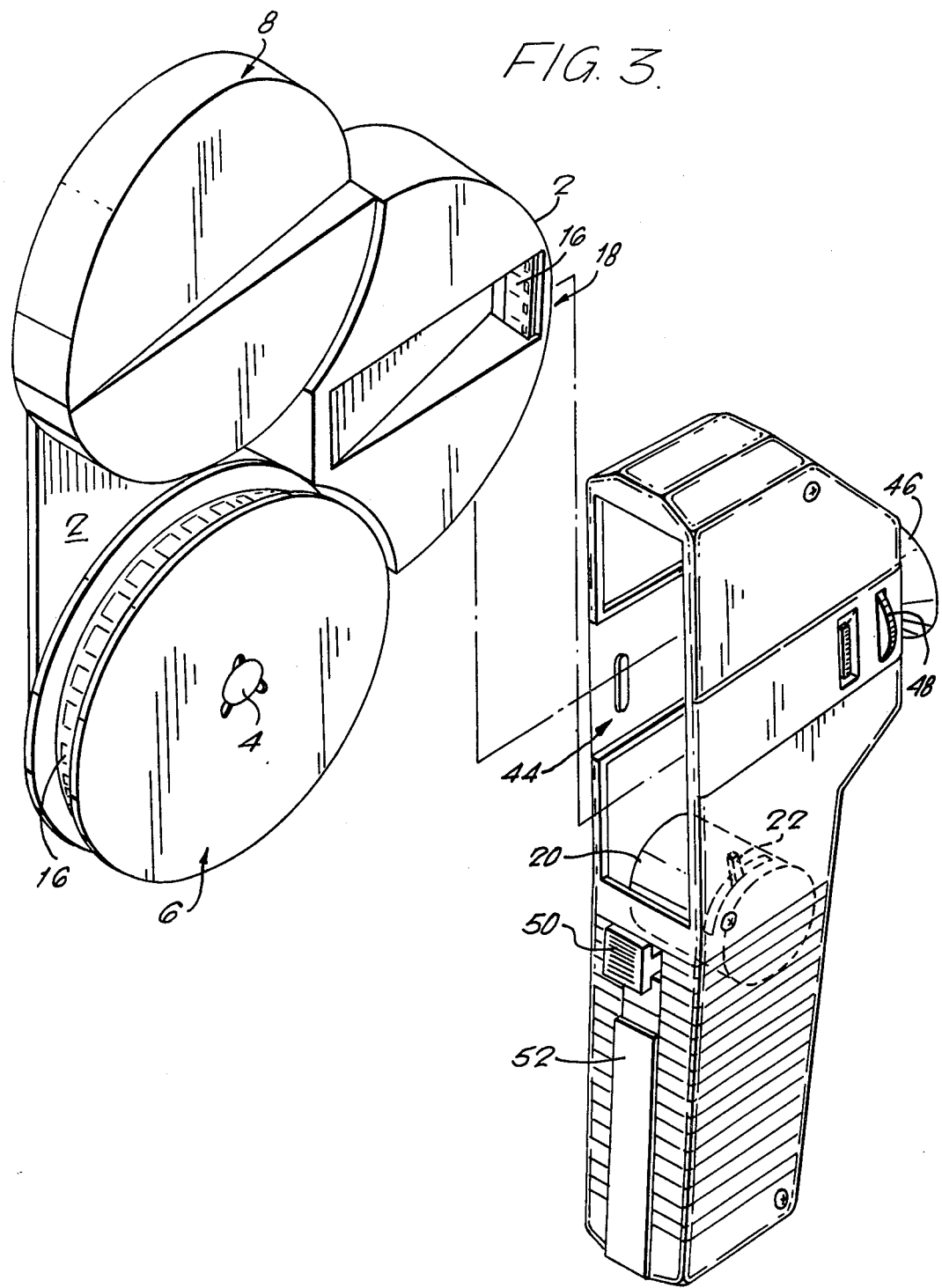
FIG. 3 is a perspective view showing the adaptor prior to insertion in a hand-held viewer.

When the adaptor device illustrated in FIGS. 1 to 3 is to be used with the viewer generally indicated in FIG. 3, its mounting plate is inserted in the opening 44 in the viewer and held therein with the viewing aperture 18 aligned with the eye piece 46 of the viewer. The lens in the eye piece may be adjusted in a conventional manner by rotation of a knurled wheel 48. The pin or needle 22 of the drive motor 20 of the viewer engages in the apertures 18 in the film, the motor being powered by a battery on operation of a manual switch 50. The batteries for the motor 20 are held in a recess in the handle of the viewer, the recess having a removale cover 52.

In use light passes through the aperture 18, through the film strip 16 so that a picture on the frame of the film opposite the aperture is seen by a user looking through the eye piece 46.

It will be appreciated that the viewer can either be used to view standard 15 meter film by using the adaptor device hereinbefore described or may be used with a film cassette of the type designed to hold endless coil of film and an example of which is described in detail in the specification of co-pending U.S. patent application Ser. No. 846,456, filed Oct. 28, 1977.

As an alternative the spindle for the let-off spool, the film guide and the take-up spool can form an integral part of a standard film projector, the main advantage being that only a drive for the film, and not a drive for the let-off or take-up spools, needs to be provided. Equally the invention can be used with a standard film viewer.

The drive for the film could be continuous instead of step by step as described above.

What we claim is:

1. An adaptor for a film viewer or projector comprising
 a base adapted to be connected in a removable position to a viewer or projector, said base being connectable to and disconnectable from said viewer or projector when desired by a user,
 a take-up spool connectable to said base, said take-up spool including an outer peripheral side wall surrounding the film received on said spool,
 a spindle mounted on said base for connecting said take-up spool to said base, and take-up spool spindle being freely rotatable relative to said base,
 a spindle mounted on said base for connecting a let-off spool to said base, said let-off spool spindle being freely rotatable relative to said base, and the axes of rotation of said take-up spool spindle and said let-off spool spindle being substantially parallel one to the other,
 guide means mounted on said base for guiding film from said let-off spool to said take-up spool,
 a viewing station located between the ends of said guide means, said viewing station including an aperture through which the images on said film can be viewed or projected,
 a film-advancing station located between the ends of said guide means, said film advancing station permitting said film to be engaged by drive means for moving said film past said viewing station, and
 a take-up guide mounted in a stationary position on said base, said take-up guide being oriented to receive film from said guide means and to direct that film over the top of one edge of the film wound on said take-up spool and down into the plane of the film wound on said take-up spool, said take-up guide also being oriented to direct said film toward said outer peripheral side wall of said take-up spool, said take-up guide cooperating with said take-up spool so that advancement of said film through said take-up guide causes engagement of said film with said outer peripheral side wall, and that engagement of said film with said outer peripheral side wall causes rotation of said take-up spool, thereby coiling said film up against said outer peripheral wall of said take-up spool as said film advances from said let-off spool to said take-up spool.

2. An adaptor as set forth in claim 1, said adaptor further comprising
 a removable cover for said take-up spool, said cover being mounted on said base, and said stationary take-up guide being fixedly connected to said cover.

3. An adaptor as set forth in claim 2, said stationary take-up guide comprising
 two spaced guide walls, one of said walls extending from adjacent the edge of said cover to adjacent the axis of said take-up spool and the other of said wall extending from adjacent the edge of said cover in a curved path for directing said film into substantially tangential engagement with said outer peripheral side wall.

4. An adaptor as set forth in claim 1, said guide means further comprising
 means for deflecting said film out of a phantom straight line extending between the position at which said film emerges from a let-off spool to the position at which said film enters said guide means at the let-off spool end of said guide means.

5. An adaptor as set forth in claim 4, said deflecting means comprising
 at least one pin mounted on said base at a position spaced outwardly from said phantom straight line.

6. An adaptor as set forth in claim 1, said adaptor further comprising
 rewind means for driving said let-off spindle, said rewind means allowing the film to be rewound from said take-up spool onto a let-off spool mounted on said spindle at the completion of viewing or projection of said film.

7. As adaptor as set forth in claim 1, said guide means being structured to direct said film over a smoothly curved path past said viewing and film-advancing stations.

8. An adaptor as set forth in claim 1, said film-advancing station comprising
 an elongated slot defined in said guide means, a drive pin being engageable with apertures in said film through said drive slot.

* * * * *